Patented Oct. 24, 1939

2,177,113

UNITED STATES PATENT OFFICE 2,177,113

DYESTUFFS OF THE DIPHENYLAMINE SERIES

Hans Krzikalla and Heinz Pardon, Ludwigshafen-on-the-Rhine, and Fritz Hess, Frankfort-on-the-Main, Germany, assignors to General Aniline Works, Inc., New York, N. Y., a corporation of Delaware No Drawing. Application December 31, 1936, Serial No. 118,584. In Germany January 22, 1936

8 Claims. (Cl. 260—500)

The present invention relates to new dystuffs of the diphenylamine series.

We have found that very valuable dyestuffs are obtained by causing dinitrobenzenes having enchangeable substituents and also containing sulphonic and/or carboxylic groups to react with amines of the general formula

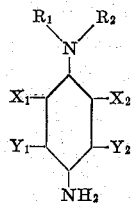

in which $R_1$ and $R_2$ are hydrogen, alkyl, cycloalkyl or aralkyl radicles, $X_1$ and $X_2$ are hydrogen or any substituents free from a negative action and $Y_1$ and $Y_2$ are hydrogen or any desired substituents. As suitable dinitrobenzenes having exchangeable substituents may be mentioned for example dinitrohalogen benzenes and dinitroalkoxybenzenes.

The reaction is generally speaking carried out in aqueous or aqueous-alcoholic solutions, advantageously in the presence of agents capable of binding acids, as for example the hydroxides or carbonates of the alkali or alkaline earth metals. The dyestuffs obtainable in the said manner are especially suitable for dyeing leather; they dye it yellow to brown shades, the dyeings having a very good penetration. The dyestuffs may also be used for dyeing wool and silk, very uniform dyeings being obtained. They are also suitable for dyeing wood thoroughly.

The following examples will further illustrate how our invention may be carried out in practice but the invention is not restricted to these examples. The parts are by weight.

Example 1

260 parts of 1-dimethylamino-4-aminobenzene-3-thiosulphonic acid are heated with 325 parts of 2,4-dinitro-1-chlorbenzene-6-sulphonic acid sodium salt, 210 parts of sodium bicarbonate and 3000 parts of water for several hours at from 80° to 90° C. The hot reaction solution is filtered if necessary, the filtrate is acidified and the yellow-green dyestuff thus separated is filtered off by suction. It dyes leather yellow-brown shades, the dyeing being thorough.

A similar dyestuff is obtained by using 2,4-dinitro-1-chlorbenzene 6-carboxylic acid or 2,4-dinitro-1-methoxybenzene-6-carboxylic acid instead of 2,4-dinitro-1-chlorbenzene-6-sulphonic acid under the same conditions. If 1-dimethylamino-4-aminobenzene-3-thiosulphonic acid be caused to react with 2,6-dinitro-1-chlorbenzene-4-sulphonic acid under the above conditions, a dyestuff is formed which thoroughly dyes leather violet-brown shades.

Example 2

50 parts of the sulphate of 1-dimethylamino-4-aminobenzene are dissolved in a mixture of 250 parts of water and 100 parts of alcohol, the solution is rendered alkaline with caustic soda solution and then there are added thereto 20 parts of sodium bicarbonate and a solution of 67 parts of 2,4-dinitro-1-chlorbenzene-6-sulphonic acid sodium salt in 250 parts of water. After the whole has been heated for about 2 hours at from 80° to 90° C., the resulting dyestuff is salted out with 120 parts of potassium chloride, filtered off by suction and dried. The dyestuff thus obtained dyes leather thoroughly brown shades.

Similar dyestuffs are obtained under the same conditions while using 1-diethylamino-4-aminobenzene, 1-dihydroxyethylamino-4-aminobenzene, 1-hydroxyethyl-benzyl-amino-4-aminobenzene, 1-hydroxyethyl-sulphobenzyl-amino-4-aminobenzene, 1-hydroxyethyl-cyclohexylamino-4-aminobenzene or 1-methylamino-2-methyl-4-aminobenzene instead of 1-dimethylamino-4-aminobenzene.

Example 3

26 parts of 1-dimethylamino-4-aminobenzene 3-sulphonic acid are heated for from 5 to 6 hours at about 100° C. with 28 parts of 2,4-dinitro-1-chlorbenzene-6-carboxylic acid, 70 parts of potassium carbonate and 300 parts of water. After cooling, the separated reaction product is filtered off by suction, dissolved in water and the solution filtered. By acidification with hydrochloric acid, the dyestuff formed is precipitated. It is filtered off by suction, washed and dried. The dyestuff thoroughly dyes leather brown shades.

A similar dyestuff is obtained if 2,4-dinitro-1-chlorbenzene-6-sulphonic acid be employed instead of the corresponding carboxylic acid.

What we claim is:

1. As new products the diphenylamines of the general formula

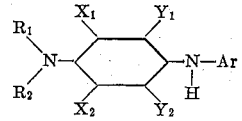

wherein Ar stands for the radicle of a dinitrobenzene mono sulphonic acid, wherein $R_1$ and $R_2$ stand for a member of the group consisting of hydrogen, lower alkyl, cyclohexyl and benzyl, wherein $X_1$ and $X_2$ stand for a member of the group consisting of hydrogen, alkyl and alkoxy groups, and wherein $Y_1$ and $Y_2$ stand for a member selected from the class consisting of hydrogen and the sulphonic and thiosulphonic acid groups, at least one of the members marked $Y_1$ and $Y_2$ being hydrogen.

2. As new products the diphenylamines of the general formula

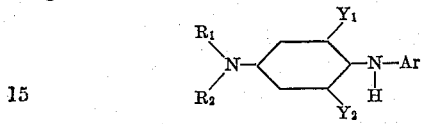

wherein Ar stands for the radicle of a dinitrobenzene mono sulphonic acid, wherein $R_1$ and $R_2$ stand for lower alkyl, and wherein $Y_1$ and $Y_2$ stand for a member selected from the class consisting of hydrogen and the sulphonic and thiosulphonic acid groups, at least one of the members marked $Y_1$ and $Y_2$ being hydrogen.

3. As new products the diphenylamines of the general formula

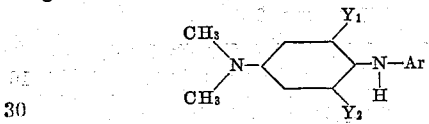

wherein Ar stands for the radicle of a dinitrobenzene mono sulphonic acid, and wherein $Y_1$ and $Y_2$ stand for a member selected from the class consisting of hydrogen and the sulphonic and thiosulphonic acid groups, at least one of the members marked $Y_1$ and $Y_2$ being hydrogen.

4. As new products the diphenylamines of the general formula

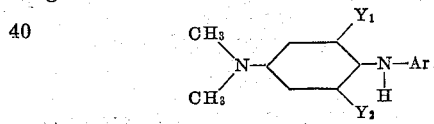

wherein Ar stands for the radicle of a dinitrobenzene sulphonic acid, and wherein $Y_1$ and $Y_2$ stand for a member selected from the class consisting of hydrogen and the sulphonic and thiosulphonic acid radicals, at least one of the members marked $Y_1$ and $Y_2$ being hydrogen.

5. As new products the diphenylamines of the general formula

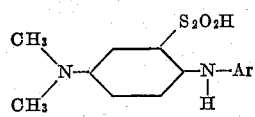

wherein Ar stands for the radicle of a dinitrobenzene sulphonic acid.

6. As a new product the diphenylamine of the formula

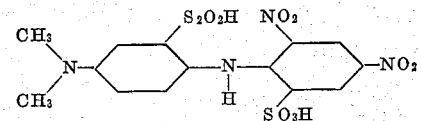

7. As a new product the diphenylamine of the formula

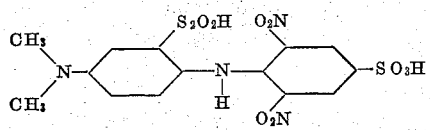

8. As a new product the diphenylamine of the formula

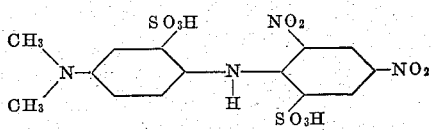

HANS KRZIKALLA.
HEINZ PARDON.
FRITZ HESS.